（12） United States Patent
Ng

(10) Patent No.: US 8,979,373 B2
(45) Date of Patent: Mar. 17, 2015

(54) LINEAR MOTION BEARING WITH INTERLOCK STRUCTURE

(75) Inventor: Alison Ng, New York, NY (US)

(73) Assignee: Thomson Industries, Inc., Amherst, NY (US)

(*) Notice: Subject to any disclaimer, the term of this patent is extended or adjusted under 35 U.S.C. 154(b) by 21 days.

(21) Appl. No.: 13/810,239

(22) PCT Filed: Jul. 15, 2011

(86) PCT No.: PCT/US2011/044158
§ 371 (c)(1),
(2), (4) Date: Mar. 28, 2013

(87) PCT Pub. No.: WO2012/009621
PCT Pub. Date: Jan. 19, 2012

(65) Prior Publication Data
US 2013/0209008 A1 Aug. 15, 2013

Related U.S. Application Data

(60) Provisional application No. 61/364,553, filed on Jul. 15, 2010.

(51) Int. Cl.
*F16C 29/06* (2006.01)
*F16C 29/04* (2006.01)
*F16C 43/04* (2006.01)

(52) U.S. Cl.
CPC .............. *F16C 29/04* (2013.01); *F16C 29/069* (2013.01); *F16C 43/04* (2013.01)
USPC ........................................................ 384/43

(58) Field of Classification Search
CPC ...... F16C 29/045; F16C 29/046; F16C 29/06; F16C 29/0602; F16C 29/0604; F16C 29/0607; F16C 29/0611; F16C 29/0676; F16C 29/068; F16C 29/0683; F16C 29/0685; F16C 29/069; F16C 29/0688
USPC ........................................... 384/25–45, 49, 50
See application file for complete search history.

(56) References Cited

U.S. PATENT DOCUMENTS 4,123,121 A 10/1978 Ernst et al.
4,678,350 A * 7/1987 Statz .............................. 384/208
5,178,474 A * 1/1993 Muntnich et al. ............. 384/577

(Continued)

FOREIGN PATENT DOCUMENTS

EP 1645762 A2 4/2006
WO 00/25034 A1 5/2000

*Primary Examiner* — Alan B Waits
(74) *Attorney, Agent, or Firm* — Dilworth & Barrese, LLP.

(57) ABSTRACT

A linear motion bearing assembly comprising a ball retainer structure having at least a portion of a plurality of open axial ball tracks formed therein. The ball tracks including an open load bearing portion, an open return portion and turnarounds interconnecting the load bearing and return portions. A plurality of bearing balls are disposed in the ball tracks. A plurality of load bearing plates are axially positioned adjacent the ball retainer structure for receiving load from the balls disposed in the load bearing portion of the ball tracks. A first outer housing sleeve is effective to hold the ball retainer structure. The first outer housing sleeve includes a first interlock structure. A second outer housing sleeve is effective to hold the ball retainer structure, the second outer housing sleeve including a second interlock structure. The first interlock structure is effective to mate with the second interlock structure.

9 Claims, 5 Drawing Sheets

(56) References Cited

U.S. PATENT DOCUMENTS

| | | |
|---|---|---|
| 5,346,313 A | 9/1994 | Ng |
| 5,924,745 A | 7/1999 | Campbell |
| 6,692,179 B2 * | 2/2004 | Bohne et al. ................. 403/141 |
| 2007/0230849 A1 * | 10/2007 | Naito ............................ 384/530 |

* cited by examiner

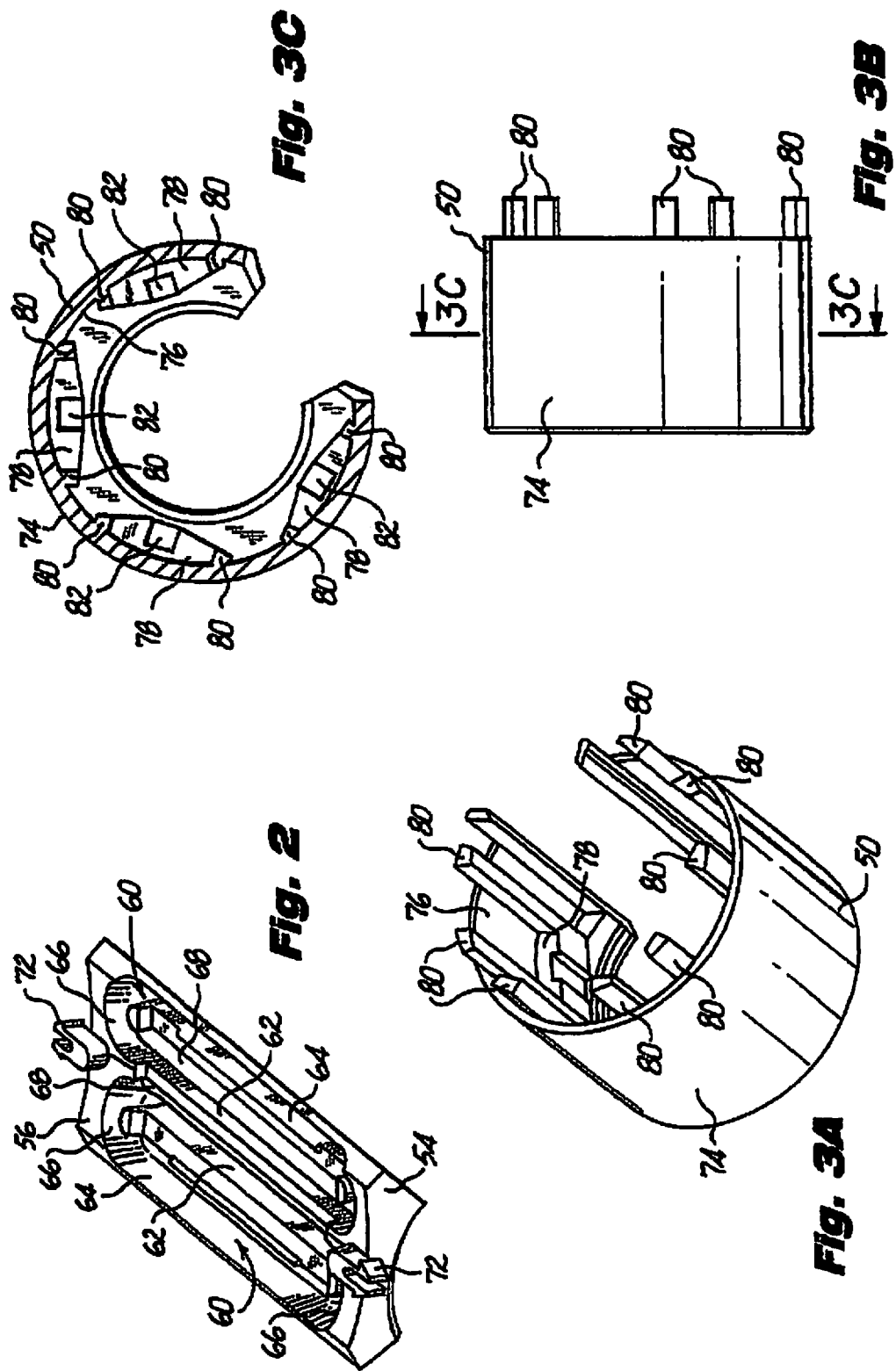

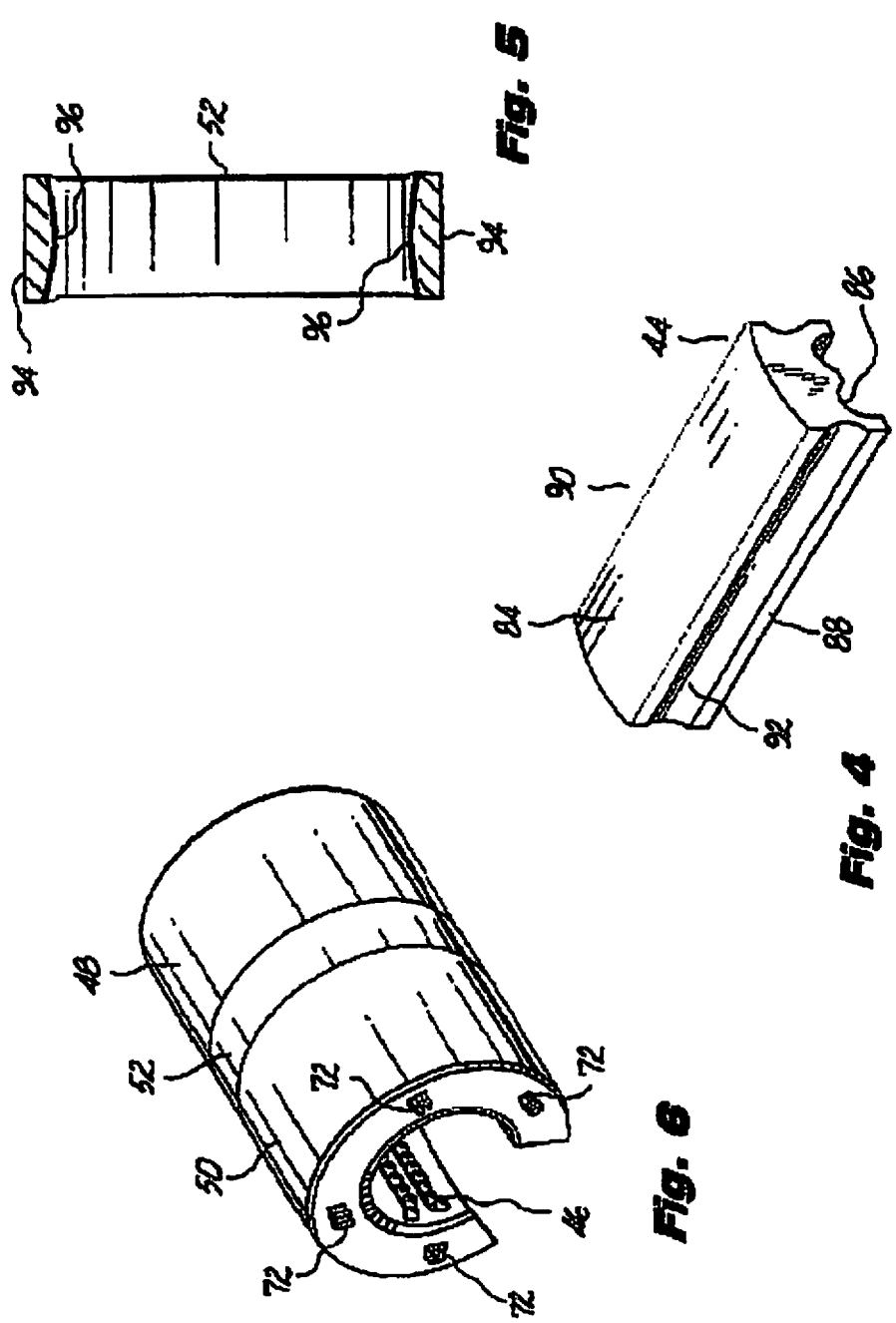

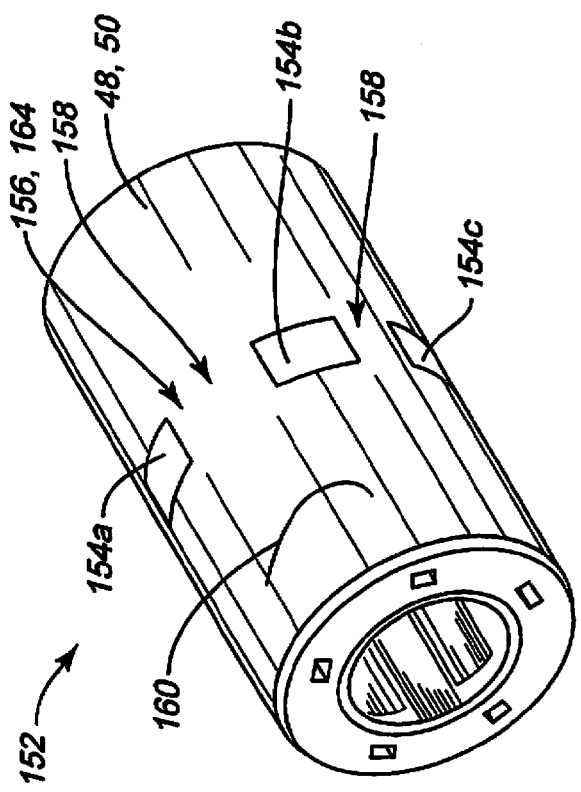
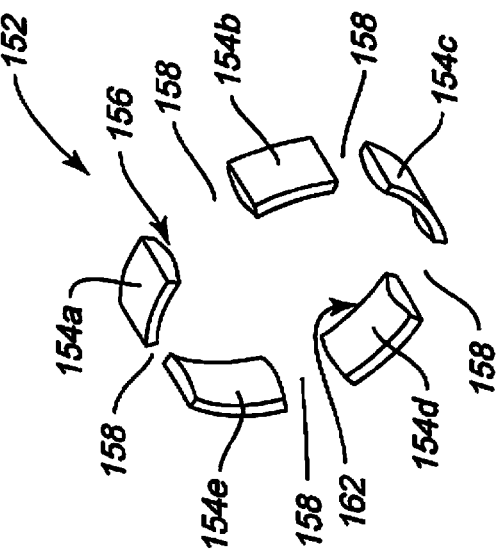

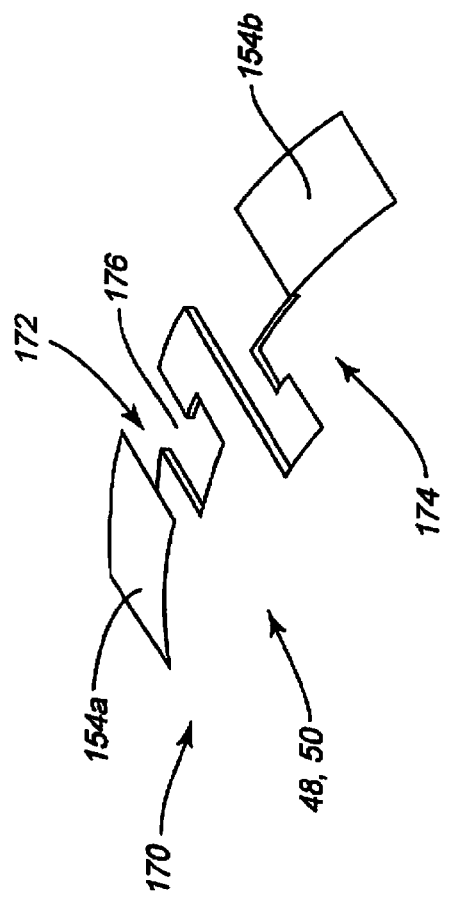
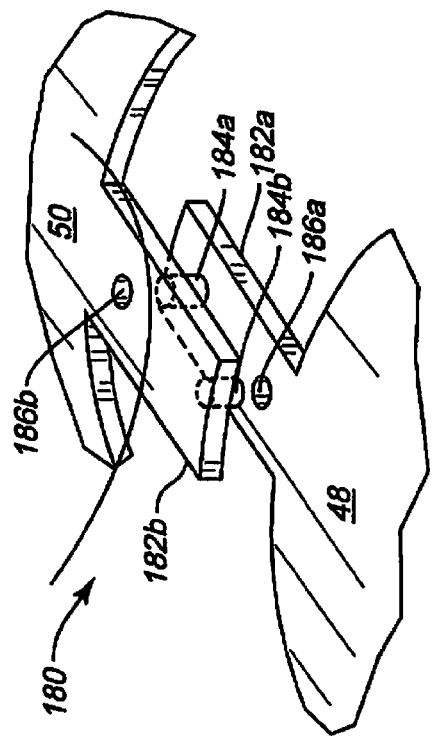

LINEAR MOTION BEARING WITH INTERLOCK STRUCTURE

CROSS REFERENCE TO RELATED APPLICATIONS

This application claims priority to provisional application No. 61/364,553 filed Jul. 15, 2010 entitled "LINEAR MOTION BEARING WITH INTERLOCK STRUCTURE", the entirety of which is hereby incorporated by reference.

BACKGROUND OF THE INVENTION

1. Field of the Invention
This disclosure relates to a linear bearing.
2. Description of the Related Art
In a linear motion bearing, a generally cylindrical housing is designed to move relative to a shaft. The housing includes a ball retaining structure comprising a plurality of ball retaining segments. Each ball retaining segment includes a plurality of ball bearings moveable in a track. The segments are mounted within the housing so that movement of the housing with respect to the shaft is effectuated through engagement of the bearings with the shaft. As the housing moves, the ball bearings move in respective tracks. This disclosure describes an improvement on these prior art systems.

SUMMARY OF THE INVENTION

One embodiment of the invention is a linear motion bearing assembly. The assembly may comprise a ball retainer structure having at least a portion of a plurality of open axial ball tracks formed therein, the ball tracks including an open load bearing portion, an open return portion and turnarounds interconnecting the load bearing and return portions. The assembly may further comprise a plurality of bearing balls disposed in the ball tracks. The assembly may further comprise a plurality of load bearing plates axially positioned adjacent the ball retainer structure, the load bearing plates effective to receive a load from the balls disposed in the load bearing portion of the ball tracks. The assembly may further comprise a first outer housing sleeve effective to hold the ball retainer structure, the first outer housing sleeve including a first interlock structure. The assembly may further comprise a second outer housing sleeve effective to hold the ball retainer structure, the second outer housing sleeve including a second interlock structure. The first interlock structure is effective to mate with the second interlock structure when the first interlock structure is placed over the second interlock structure and the first and second interlock structure are effective to resist a force extending longitudinally outward from the linear motion bearing assembly.

Another embodiment of the invention is a linear motion bearing assembly. The assembly may comprise a ball retainer structure having at least a portion of a plurality of open axial ball tracks formed therein, the ball tracks including an open load bearing portion, an open return portion and turnarounds interconnecting the load bearing and return portions. The assembly may further comprise a plurality of bearing balls disposed in the ball tracks. The assembly may further comprise a plurality of load bearing plates axially positioned adjacent the ball retainer structure, the load bearing plates effective to receive a load from the balls disposed in the load bearing portion of the ball tracks. The assembly may further comprise a first outer housing sleeve effective to hold the ball retainer structure, the first outer housing sleeve including a first interlock structure. The assembly may further comprise a second outer housing sleeve effective to hold the ball retainer structure, the second outer housing sleeve including a second interlock structure. The assembly may further comprise a bearing plate to housing intermediary load structure, the bearing plate to housing intermediary load structure comprising a plurality of pieces and defining at least two spaces in between the pieces, the bearing plate to housing intermediary load structure extending circumferentially around the first and second outer housing sleeve. The first interlock structure is effective to mate with the second interlock structure when the first interlock structure is placed over the second interlock structure and the first and second interlock structure are effective to resist a force extending longitudinally outward from the linear motion bearing assembly. The first and second interlock structure are hermaphroditic. The first and second interlock structure have the same structure. The first interlock structure includes walls defining a space, and at least one of the pieces of the bearing plate to housing intermediary load structure is effective to be disposed in the space.

Another embodiment of the invention is method for assembling a linear motion bearing assembly. The method may comprise mating a first outer housing sleeve and a second outer housing sleeve over a ball retainer structure, the first outer housing sleeve including a first interlock structure, the second outer housing sleeve including a second interlock structure, the ball retainer structure having at least a portion of a plurality of open axial ball tracks formed therein, the ball tracks including an open load bearing portion, an open return portion and turnarounds interconnecting the load bearing and return portions. The method may further comprise placing a plurality of bearing balls in the ball tracks. The method may further comprise placing a plurality of load bearing plates axially positioned adjacent the ball retainer structure and the first and second outer housing sleeve, the load bearing plates effective to receive a load from the balls disposed in the load bearing portion of the ball tracks. The first and second interlock structure are effective to resist a force extending longitudinally outward from the linear motion bearing assembly.

BRIEF DESCRIPTION OF THE DRAWINGS

The drawings constitute a part of the specification and include exemplary embodiments of the present invention and illustrate various objects and features thereof.

FIG. 2 is a perspective view of a ball retainer segment;

FIG. 3A is a perspective view of a sleeve portion of the outer housing of the linear motion bearing assembly of FIG. 1.

FIG. 3B is a side view of the sleeve portion of FIG. 3A.

FIG. 3C is a cross-sectional view taken along line 3C-3C in FIG. 3B of the sleeve portion of FIG. 3A.

FIG. 4 is a perspective view of the load bearing plate in accordance with the linear motion bearing assembly of FIG. 1.

FIG. 5 is a cross-sectioned view of the bearing plate to housing intermediary taken along line 5-5 of FIG. 1.

FIG. 6 is a perspective view of the assembled linear motion bearing assembly of FIG. 1.

FIG. 7 is a perspective view of a linear motion bearing assembly.

FIG. 8 is an exploded perspective view of a bearing plate to housing intermediary load structure.

FIG. 9 is a perspective view of an interlock structure of a linear motion bearing assembly.

FIG. 10 is a perspective view of an interlock structure of a linear motion bearing assembly.

DETAILED DESCRIPTION OF THE PREFERRED EMBODIMENT(S)

Figure 1:
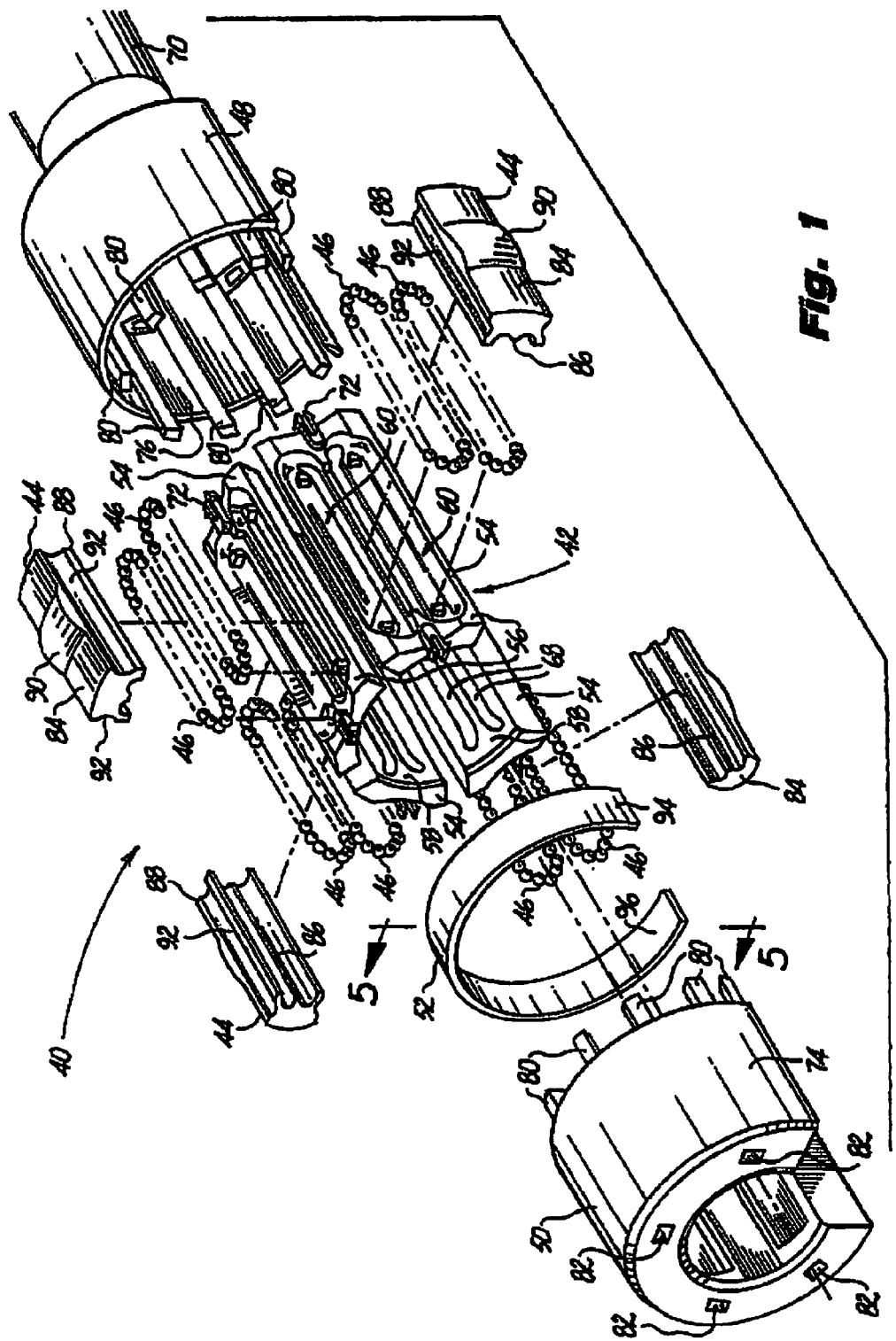
FIG. 1 is an exploded perspective view of a linear motion bearing assembly.

Various embodiments of the invention are described hereinafter with reference to the figures. Elements of like structures or function are represented with like reference numerals throughout the figures. The figures are only intended to facilitate the description of the invention or as a guide on the scope of the invention. In addition, an aspect described in conjunction with a particular embodiment of the invention is not necessarily limited to that embodiment and can be practiced in conjunction with any other embodiments of the invention.

Referring to FIGS. 1-6, there is shown a linear motion open-type bearing assembly 40. The bearing assembly includes ball retainer structure, shown generally at 42, load bearing plates 44, bearing balls 46, outer housing sleeves 48, 50 and bearing plate to housing intermediary load structure 52.

Focusing on FIG. 2, ball retainer structure 42, in one example, comprises four ball retainer segments 54, each operatively associated with adjacent ball retainer segments along longitudinal sides thereof to form a polygonally shaped ball retainer structure having a bore there through for receiving a shaft 70. Each ball retainer segment 54 includes an outer radial surface 56 and an inner radial surface 58. Axial ball tracks 60 are formed in the outer radial surface 56 of each ball retainer segment 54 and include load bearing portions 62, return portions 64 and turnarounds 66. The load bearing and return portions of the ball tracks in this embodiment are undercut to facilitate loading and retention of the bearing balls 46 therein. This also eliminates the need for a separate retainer structure to keep the bearing balls in the ball tracks. A longitudinal bore 68 in the inner radial surface 58 of the ball retainer segment 54 extends substantially the length of the load bearing portions 62 and accesses shaft 70. Although shaft 70 is illustrated as a substantially cylindrical shaft, support members of other configurations may also be used.

A plurality of bearing balls 46 are disposed in the ball tracks 60 with those bearing balls 46 in the load bearing tracks 62 extending at least partially into longitudinal bores 68 to contact support shaft 70. In this embodiment, a pair of axial ball tracks 60 are formed in each outer radial surface 56 of the ball retainer segment with the corresponding load bearing tracks being oriented in substantially parallel adjacent relation. This orientation facilitates enhanced load capacity and maximizes space utilization for a more compact and efficient bearing ball arrangement. A locking structure in the form of locking clips 72 are formed on opposing longitudinal ends of each ball retainer segment 54 to facilitate assembly with outer housing sleeves 48, 50, discussed in greater detail herein below.

Referring now to FIGS. 1 and 3A-C, the linear motion bearing assembly in accordance with one preferred embodiment includes a pair of outer housing sleeves 48, 50 which, when assembled serve to close and protect the exposed outer radial surfaces 56 of ball retainer structure 42.

The outer radial surface 74 of sleeves 48, 50 are preferably of a smooth cylindrical shape and are configured and dimensioned to fit within a mounting bore of a tool carriage (not shown). The inner radial surface 76 of sleeves 48, 50 include mounting surfaces 78 which are configured to receive at least a portion of load bearing plates 44 therein. These mounting surfaces 78 further include extension portions 80 which define a mounting space for bearing plate to housing intermediary load structure 52, described in greater detail below. Mounting surfaces 78 are recessed from outer radial surface 74 by a distance approximating the cross-sectional thickness of bearing plate to housing intermediary load structure 52. In this manner, the outer housing sleeves 48, 50 and the bearing plate to housing intermediary load structure 52 combine to form a relatively smooth and uniform outer radial surface of the linear motion bearing assembly 40. See, FIG. 6.

In this embodiment, mounting surfaces 78 are configured to fit the shape of individual ball retainer segments 54. A plurality of locking bores 82 are formed in respective ends of sleeves 48, 50 in alignment with locking clips 72 of ball retainer segments 54. Thus, when the ball retainer segments 54 are assembled into the sleeves 48, 50, locking clip 72 extends into respective locking bores 82 and assists in holding linear motion bearing assembly 40 together.

Referring now to FIGS. 1 and 4, a plurality of individual load bearing plates 44 are incorporated into the linear motion bearing assembly 40 and serve to receive load from the bearing balls 46 in contact with shaft 70. In the embodiment of FIG. 4, load bearing plate 44 is elongated along the longitudinal axis of the bearing assembly and includes an outer radial surface 84, an inner radial surface 86, and a pair of side wall surfaces 88. The outer radial surface 84 is substantially accurate and may include a crown portion 90 disposed on the outer radial surface 84 in a medial position. Crown portion 90 is configured and dimensioned to permit the load bearing plates 44 to rock both circumferentially and longitudinally into and out of parallelism with the axes of the ball retainer structure 42.

The inner radial surface 86 of the load bearing plate is advantageously provided with a pair of axial grooves which serve as the upper surface of load bearing portions 62 of ball tracks 60. By providing a single load bearing plate 44 for each pair of load bearing portions 62 in each outer radial surface 56, the linear motion bearing assembly 40 is easier to fabricate and assemble. Further, the bearing assembly has a high load bearing capacity.

In this embodiment, a longitudinal groove 92 is formed in each side wall surface 88 of load bearing plates 44. These grooves 92 make up a side wall of the axial ball tracks 60 and guide bearing balls 46 as they move through the return portion thereof.

Referring now to FIGS. 1, 5 and 6, bearing plate to housing intermediary load structure 52 is illustrated in a C-ring configuration having an outer radial surface 94 conforming substantially in dimension to the outer radial surface 74 of sleeves 48, 50. In this embodiment, the inner radial surface 96 is substantially parallel to the outer radial surface and is configured and dimensioned, when assembled, to contact crown portion 90 of load bearing plates 44. In an example, the radius of curvature of the crown portion 90 in the transverse direction is smaller than the radius of curvature of the inner radial surface of the bearing plate to housing intermediary load structure 52. This configuration allows the plates to rock circumferentially with respect to the inner surface of the bearing plate to housing intermediary load structure 52. In other examples, crown portion 90 is substantially flat at shown in FIG. 4.

Further, referring to FIGS. 1 and 6, the bearing plate to housing intermediary load structure 52 encompasses and engages extension portions 80 of sleeve 48, 50 to assist in enclosing and protecting ball retainer structure 42. Although shown in a narrow width, the bearing plate to housing intermediary load structure 52 may extend substantially the entire longitudinal length of the bearing assembly. The bearing plate to housing intermediary load structure is preferably formed of a hard abrasion resistant material such as, for example, stainless steel or ceramic. Alternatively, a softer material such as bronze or aluminum may also be used.

FIGS. 7 and 8 are perspective view drawings of another bearing plate to housing intermediary load structure 152. Bearing plate to housing intermediary load structure 54 in FIGS. 1-6 was substantially one piece and monolithic. Bearing plate to housing intermediary load structure 152 is comprised of at least two discrete pieces 154 with spaces 158 in between pieces 154. Five pieces 154a, 154b, 154c, 154d, 154e are shown in FIG. 8 though any number of pieces could be used. Pieces 154 may be cylinders, spheres, flattened cylinders, pyramids, etc. An odd number of pieces may make it easier to tune bearing plate to housing intermediary load structure 152. Pieces 154 may be distributed around a circumference of sleeve 48, 50 so that each space 158 between each piece 154 is of the same size. Sleeve 48, 50 may comprise multiple pieces or a single piece.

Each piece 154 has an internal arc with a radius of curvature 162 (FIG. 8) that corresponds to or is slightly larger than a radius of curvature 160 of outer housing sleeve 48, 50. The inventor has discovered that the tolerance accuracy needed to manufacture monolithic bearing plate to housing intermediary load structure 52 (FIGS. 1-6) is quite high and therefore expensive to produce. In fact, a high percentage of manufactured pieces may need to be discarded because of the high necessary tolerances. If bearing plate to housing intermediary load structure 52 includes dimensions too far removed from defined tolerances, excess unbalanced pressure may be placed on outer housing sleeve 48, 50 and then on bearing balls 46 (FIG. 1).

In contrast, tolerance accuracy requirements are lower for bearing plate to housing intermediary load structure 152 having multiple pieces 154. Each piece 154 requires less tolerance accuracy which results in faster, less expensive manufacturing. Pieces 154 are less sensitive to twisting forces applied to outer housing sleeve 48, 50. Bearing plate to housing intermediary load structure 152 is less sensitive to out of "roundness" from each piece 154. Less material is used for bearing plate to housing intermediary load structure 152 and more manufacturing methods are available. Powder metal could be used to manufacture pieces 154.

A retention member 156 (best seen in FIG. 8) may be used to affix bearing plate to housing intermediary load structure 152 to outer housing sleeve 48, 50. Retention member 156 could be, for example, a flare from each piece 154, a male extension, a female extension, etc. A corresponding mating retention member 164 may be disposed in outer housing sleeve 48, 50. Mating retention member 164 could be, for example, a recess, a female extension, a male extension, etc. Each piece 154 may be pliant and biased toward the position shown in the figures. In this way, to assemble each piece 154 may be pinched and inserted into recesses 164 of outer housing sleeve 48, 50 so that flares 156 are bent inwardly. The bias causes piece 154 to resume the position shown to mate with recesses 158.

Reference now may be made to FIG. 9 where there is shown another structure that could be used to hold together linear motion bearing assembly 40. As shown, an interlock structure 170 may be formed on outer housing sleeves 48, 50 or on other sleeves used in a linear motion bearing assembly. One sleeve 48, 50 is shown in FIG. 9 for simplicity. Interlock structure 170 may be hermaphroditic including both male and female type structures. One interlock structure 170 may be formed on outer housing sleeve 48 and a second interlock structure 170 may be formed on outer housing sleeve 50. In this way, when outer housing sleeve 48 is moved along a longitudinal axis of linear motion bearing assembly 40, into engagement with outer housing sleeve 50, first interlock structure 170 is placed over and mates with second interlock structure 170 thereby holding linear motion bearing assembly 40 together. Interlock structures 170 may be placed around pieces 154a, 154b of bearing plate to housing intermediary load structure 152 discussed above so that piece 154a, 154 may be disposed in a space 176 defined by walls of interlock structure 170.

FIG. 10 shows another structure that could be used to hold together linear motion bearing assembly 40. As shown, an interlock structure 180 may be formed on outer housing sleeves 48, 50 or on other sleeves used in a linear motion bearing assembly. Interlock structure 180 may include a tab 182, a cylindrical protrusion 184, and a recess 186. Tab 182 may be, for example, rectangular in cross-section. Outer housing sleeve 48 may include one tab 182a and outer housing sleeve 50 may include a second tab 182b. In this way, when outer housing sleeve 48 is brought into engagement with outer housing sleeve 50, first interlock structure 180 is placed over second interlock structure 180, and tab 182a can be overlapped with tab 182b. Protrusion 184a can be placed into recess 186b and protrusion 184b can be placed into recess 186a thereby holding linear motion bearing assembly 40 together.

Interlock structure 170 and interlock structure 180 could both be used in a single linear motion bearing assembly 40—for example, on diametrically opposed sides. As interlock structure 170 includes the same structure on both outer housing sleeve 48 and 50, the production of linear motion bearing assembly 40 may be simplified. Only a single type of sleeve may be produced as the sleeves are interchangeable. Interlock structures 170, 180 prevent linear motion bearing assembly 40 from being pulled apart due to forces extending longitudinally outward away from a center of linear motion bearing assembly 40. Locking clips 72 (discussed above with reference to FIGS. 1-6) likely would not be able to resist such forces without interlock structures 170, 180. Interlock structures 170, 180 thus improve an integrity of linear motion bearing assembly 40.

While the invention has been described with reference to a number of exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to any particular exemplary embodiment disclosed herein.

What is claimed is:
1. A linear motion bearing assembly comprising:
a ball retainer structure having at least a portion of a plurality of axial ball tracks formed therein, the ball tracks including an open load bearing portion, a return portion and turnarounds interconnecting the load bearing and return portions;
a plurality of bearing balls disposed in the ball tracks;
a plurality of load bearing plates axially positioned adjacent the ball retainer structure, the load bearing plates effective to receive a load from the balls disposed in the load bearing portion of the ball tracks;
a first outer housing sleeve effective to hold the ball retainer structure, the first outer housing sleeve including a first interlock structure; and a second outer housing sleeve effective to hold the ball retainer structure, the second outer housing sleeve including a second interlock structure, wherein the first interlock structure is effective to mate with the second interlock structure when the first interlock structure is placed over the second interlock structure and the first and second interlock structures are effective to resist a force extending longitudinally outward from the linear motion bearing assembly, and further comprising:

a bearing plate to housing intermediary load structure, the bearing plate to housing load structure comprising a plurality of and defining two spaces in between the pieces, the bearing plate to housing intermediary load structure extending, circumferentially around the first and second outer housing sleeves; and the first interlock structure includes walls defining a space, and at least one of the pieces is effective to be disposed in the space.

2. The linear motion bearing assembly as recited in claim 1, wherein the first and second interlock structures are hermaphroditic.

3. The linear motion bearing assembly as recited in claim 1, wherein the first and second interlock structures have complementary configuration.

4. The linear motion bearing assembly as recited in claim 1, further comprising a third interlock structure and a fourth interlock structure, wherein:

the third interlock structure is effective to mate with the fourth interlock structure;

the first and second interlock structures are hermaphroditic; and the third and fourth interlock structures each include a respective tab, cylindrical protrusion, and walls defining a recess.

5. A linear motion bearing assembly comprising:

a ball retainer structure having at least a portion of a plurality of axial ball tracks formed therein, the bail tracks including an open load bearing portion, a return portion and turnarounds interconnecting the load bearing and return portions;

a plurality of bearing balls disposed in the ball tracks;

a plurality of load bearing plates axially positioned adjacent the ball retainer structure, the load bearing plates effective to receive a load from the balls disposed in the load bearing portion of the ball tracks;

a first outer housing sleeve effective to hold the ball retainer structure, the first outer housing sleeve including a first interlock structure;

a second outer housing sleeve effective to hold the ball retainer structure, the second outer housing sleeve including a second interlock structure; and a bearing plate to housing intermediary load structure, the bearing plate to housing intermediary load structure comprising a plurality of pieces and defining two spaces in between the pieces, the bearing plate to housing intermediary load structure extending circumferentially around the first and second outer housing sleeves; wherein the first interlock structure is effective to mate with the second interlock structure when the first interlock structure is placed over the second interlock structure and the first and second interlock structures are effective to resist a force extending longitudinally outward from the linear motion bearing assembly;

the first and second interlock structures are hermaphroditic;

the first and second interlock structures have complementary configuration;

the first interlock structure includes walls defining a space, and at least one of the pieces of the bearing plate to housing intermediary load structure is effective to be disposed in the space.

6. The linear motion bearing assembly as recited in claim 5, wherein the first and second interlock structures each include a respective tab, cylindrical protrusion, and walls defining a recess.

7. The linear motion bearing assembly as recited in claim 6, wherein the tabs are rectangular in cross-section.

8. The linear motion bearing assembly as recited in claim 7, wherein the respective tabs overlap when first interlock structure is mated with second interlock structure.

9. The linear motion bearing assembly as recited in claim 6, wherein the cylindrical protrusion of the first interlock structure extends away from the tab of the first interlock structure and is effective to mate with the recess of the second interlock structure.

* * * * *